US012257831B2

(12) United States Patent
Amano et al.

(10) Patent No.: US 12,257,831 B2
(45) Date of Patent: Mar. 25, 2025

(54) LIQUID EJECTING APPARATUS

(71) Applicant: SEIKO EPSON CORPORATION, Tokyo (JP)

(72) Inventors: Atsushi Amano, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 247 days.

(21) Appl. No.: 18/183,198

(22) Filed: Mar. 14, 2023

(65) Prior Publication Data

US 2023/0294396 A1 Sep. 21, 2023

(30) Foreign Application Priority Data

Mar. 16, 2022 (JP) ................................ 2022-041094

(51) Int. Cl.
*B41J 2/045* (2006.01)

(52) U.S. Cl.
CPC ....... *B41J 2/04515* (2013.01); *B41J 2/04541* (2013.01); *B41J 2202/08* (2013.01)

(58) Field of Classification Search
CPC B41J 2/04515; B41J 2/04541; B41J 2202/08; B41J 2/0455; B41J 2/04593; B41J 2/04596; B41J 2/04588; B41J 2/04581; B41J 2/14072; B41J 2002/14491; B41J 2/04565
See application file for complete search history.

(56) References Cited

U.S. PATENT DOCUMENTS

2020/0269569 A1* 8/2020 Watanabe ........... B41J 2/04581

FOREIGN PATENT DOCUMENTS

| | | | | |
|---|---|---|---|---|
| CN | 116353205 | * | 6/2023 | ................ B41J 2/01 |
| EP | 0498293 | * | 8/1992 | ............ B41J 2/1603 |
| JP | H06-112678 A | | 4/1994 | |

* cited by examiner

*Primary Examiner* — Kristal Feggins
(74) *Attorney, Agent, or Firm* — Global IP Counselors, LLP

(57) ABSTRACT

A liquid ejecting apparatus includes an ejection portion that ejects a reactive ink, a driving circuit that generates a driving signal to drive the ejection portion, a heat sink that dissipates heat generated in the driving circuit due to generation of the driving signal, and a heat conduction member that conducts the heat generated in the driving circuit to the heat sink. The heat conduction member includes a heat conductive material with an insulating property whose state is not changed by a chemical reaction with the reactive ink, and a reinforcing member with an insulating property whose state is not changed by a chemical reaction with the reactive ink.

8 Claims, 7 Drawing Sheets

FIG. 6

| Sd[m] | D[m] | QS[m] | |
|---|---|---|---|
| | | TQ1 | TQ2 |
| 1 | DP-1 | H | H |
| 2 | DP-2 | H | L |
| 3 | DP-3 | L | H |
| 4 | DP-N | L | L |

LIQUID EJECTING APPARATUS

The present application is based on, and claims priority from JP Application Serial Number 2022-041094, filed Mar. 16, 2022, the disclosure of which is hereby incorporated by reference herein in its entirety.

BACKGROUND

1. Technical Field

The present disclosure relates to a liquid ejecting apparatus.

2. Related Art

In a liquid ejecting apparatus that ejects ink from ejection portions by driving the ejection portions to form an image on a medium, there is a probability that a failure occurs in a driving circuit due to heat generated in the driving circuit that drives the ejection portions. There is also a probability that, when dust adheres to the driving circuit, a failure occurs in the driving circuit. In JP-A-6-112678, in order to suppress occurrence of such a failure, a technique related to a liquid ejecting apparatus including a housing that cools a driving circuit and suppresses dust adhering to the driving circuit is proposed.

However, in the technique described in JP-A-6-112678, when the ink ejected from the ejection portions becomes mist and floats inside the liquid ejecting apparatus, adherence of mist to the driving circuit cannot be suppressed. Therefore, due to adherence of mist, which is generated as ink is ejected, to the driving circuit, a failure is more likely to occur in the driving circuit.

In recent years, along with applications of liquid ejecting apparatuses diversified, a reactive ink, such as a solvent ink obtained by dispersing a coloring material in a solvent or a photoreactive ink whose property is changed through irradiation of light is used as ink in some cases. However, in the technique described in JP-A-6-112678, since a reactive ink ejected from a liquid ejection head becomes mist and floats inside the liquid ejecting apparatus, it is more likely that, due to adherence of the reactive ink in the form of mist to the driving circuit, a failure occurs in the driving circuit.

SUMMARY

A liquid ejecting apparatus according to the present disclosure includes an ejection portion that ejects a reactive ink, a driving circuit that generates a driving signal to drive the ejection portion, a heat sink that dissipates heat generated in the driving circuit due to generation of the driving signal, and a heat conduction member that conducts the heat generated in the driving circuit to the heat sink, and the heat conduction member includes a heat conductive material with an insulating property whose state is not changed by a chemical reaction with the reactive ink, and a reinforcing member with an insulating property whose state is not changed by a chemical reaction with the reactive ink.

BRIEF DESCRIPTION OF THE DRAWINGS

FIG. 6 is a table illustrating an example of an individual designation signal.

DESCRIPTION OF EXEMPLARY EMBODIMENTS

An embodiment of the present disclosure will be described below with reference to the accompanying drawings. However, in each of the drawings below, dimensions and a scale of each part are different from actual ones as appropriate. The embodiment described below is a preferable concreate example of the present disclosure, and therefore, have various kinds of technically preferred limitations. The scope of the present disclosure, however, is not limited to such embodiments unless there is any description specifically limiting the present disclosure in the following description.

A. EMBODIMENT

In this embodiment, a liquid ejecting apparatus will be described using, as an example, an ink jet printer that ejects ink to form an image on recording paper PP.

1. Outline of Ink Jet Printer

An example of a configuration of an ink jet printer 1 according to this embodiment will be described below with reference to FIG. 1 to FIG. 3.

Figure 1:
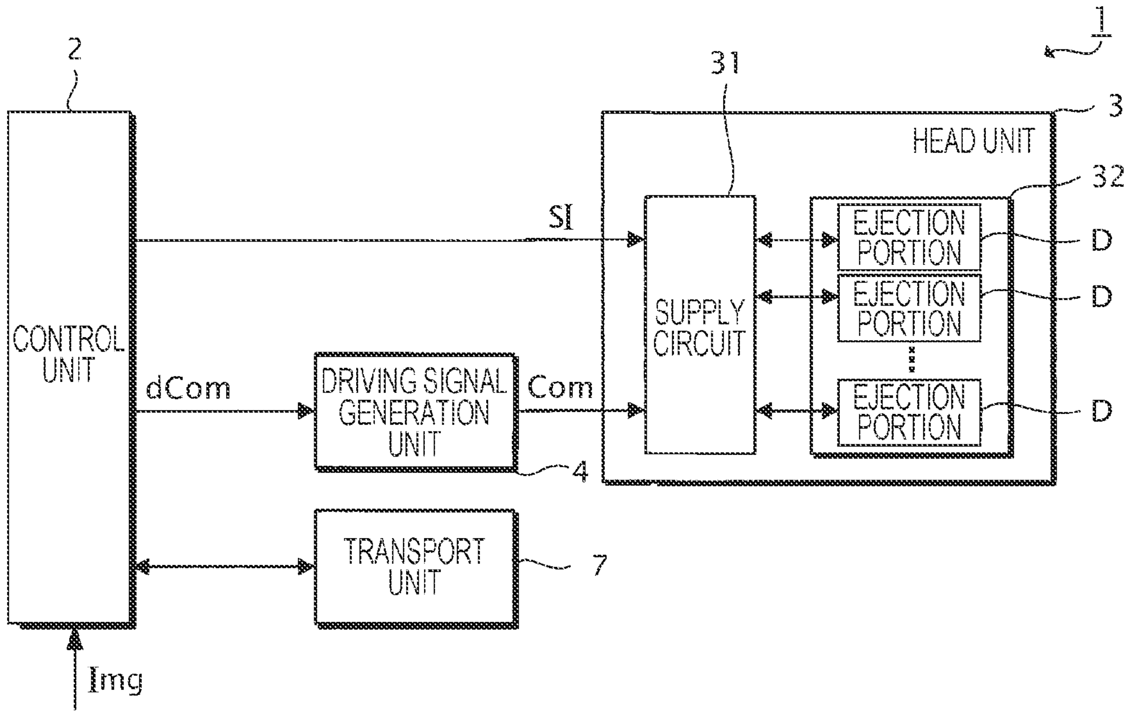
FIG. 1 is a block diagram illustrating an example of a configuration of an ink jet printer according to an embodiment of the present disclosure.

FIG. 1 a functional block diagram illustrating an example of a configuration of the ink jet printer 1.

As illustrated in FIG. 1, print data Img indicating an image that the ink jet printer 1 is to form is supplied to the ink jet printer 1 from a host computer, such as a personal computer, a digital camera, or the like. The ink jet printer 1 executes print processing of forming the image indicated by the print data Img supplied from the host computer on the recording paper PP. Note that the recording paper PP is an example of a "medium".

The ink jet printer 1 includes a control unit 2 that controls each component of the ink jet printer 1, a head unit 3 in which an ejection portion D that ejects ink is provided, a driving signal generation unit 4 that generates a driving signal Com to drive the ejection portion D, and a transport unit 7 that changes a relative position of the recording paper PP with respect to the head unit 3. Note that the ink jet printer 1 is an example of a "liquid ejecting apparatus", and the driving signal generation unit 4 that generates the driving signal Com to drive the ejection portion D includes, for example, one or more electric circuits and is an example of a "driving circuit".

In this embodiment, a reactive ink is used as the ink that is ejected from the ejection portion D by the ink jet printer 1. Herein, the term "reactive ink" is a generic term for solvent inks, photoreactive inks, textile printing inks, and pretreatment inks. Among the above-described inks, the solvent inks are inks each in which a color material, such as a pigment, a dye, or the like, is dispersed in any one of solvents of various types, such as an oily solvent, an aqueous solvent, or the like. As for the solvent inks, for example, JP-A-2014-80539 discloses a solvent ink. The photoreactive inks are inks whose properties are changed through light irradiation. Examples of the photoreactive inks include, for example, an ultraviolet curing ink that is cured through irradiation of ultraviolet rays. As for the photoreactive inks, for example, JP-A-2015-174077 discloses a photoreactive ink. Textile printing inks are inks suitable for printing of textiles. As for the textile printing inks, for example, JP-A-2017-222943 discloses a textile printing ink. Pretreatment inks are inks that are applied to textiles in advance as pretreatment before printing. As for the pretreatment inks, for example, JP-A-2004-143621 discloses a pretreatment ink. The reactive inks described above tend to be high in aggressiveness to organic materials, as compared to aqueous inks.

In this embodiment, it is assumed that the ink jet printer 1 includes one or more head units 3 and one or more driving signal generation units 4 corresponding to the one or more head units 3 on a one-to-one basis. Specifically, in this embodiment, it is considered that the ink jet printer 1 includes four head units 3 and four driving signal generation units 4 corresponding to the four head units 3 on a one-to-one basis. However, in the following, for convenience, as illustrated in FIG. 1, description is sometimes made with focus on one head unit 3 of the four head units 3 and one driving signal generation unit 4 of the four driving signal generation units 4 that is provided to correspond to the one head unit 3.

The control unit 2 includes one or more CPUs. However, the control unit 2 may include, instead of the one or more CPUs or in addition to the one or more CPUs, a programmable logic device, such as a FPGA or the like. As used herein, the term “CPU” is an abbreviation for central processing unit, and the term “FPGA” is an abbreviation for field-programmable gate array. The control unit 2 includes memory. The memory includes one or both of volatile memory and nonvolatile memory. Examples of volatile memory include random access memory (RAM) or the like, and examples of nonvolatile memory include read only memory (ROM), electrically erasable programmable read-only memory (EEPROM), programmable ROM (PROM), or the like.

Although details will be described later, the control unit 2 generates signals, such as a print signal SI, a waveform designation signal dCom, or the like, to control an operation of components of the ink jet printer 1.

Herein, the term “waveform designation signal dCom” refers to a digital signal that defines a waveform of a driving signal Com. The term “driving signal Com” refers to an analog signal that drives the ejection portion D. The driving signal generation unit 4 includes a digital-to-analogue (DA) conversion circuit and generates the driving signal Com having a waveform defined by the waveform designation signal dCom. The print signal SI is a digital signal that designates a type of an operation of the ejection portion D. Specifically, the print signal SI is a signal that designates a type of an operation of the ejection portion D by designating whether to supply the driving signal Com to the ejection portion D.

As illustrated in FIG. 1, the head unit 3 includes a supply circuit 31 and a recording head 32.

The recording head 32 includes M ejection portions D. Herein, a value M is a natural number that satisfies “M≥1”. In the following, among the M ejection portions D provided in the recording head 32, an mth ejection portion D will be sometimes referred to as an ejection portion D[m]. Herein, a variable m is a natural number that satisfies “1≥m≥M”. In the following, when a component element of the ink jet printer 1, a signal, or the like corresponds to the ejection portion D[m] among the M ejection portions D, a suffix [m] is sometimes attached to a sign representing the component element, the signal, or the like.

The supply circuit 31 switches, based on the print signal SI, whether the driving signal Com is supplied to the ejection portion D[m]. Note that, among the driving signals Com, a driving signal Com supplied to the ejection portion D[m] will be hereinafter sometimes referred to as a supply driving signal Vin[m].

As described above, in this embodiment, the ink jet printer 1 executes print processing. When the print processing is executed, the control unit 2 generates, based on the print data Img, a signal, such as the print signal SI or the like, that controls the head units 3. When the print processing is executed, the control unit 2 generates a signal, such as the waveform designation signal dCom or the like, that controls the driving signal generation unit 4. Moreover, when the print processing is executed, the control unit 2 generates a signal that controls the transport unit 7. Thus, in the print processing, the control unit 2 controls the components of the ink jet printer 1 to adjust whether to eject ink from the ejection portion D[m], an ink ejection amount, an ink ejection timing, or the like such that an image corresponding to the print data Img is formed on the recording paper PP, while controlling the transport unit 7 to change the relative position of the recording paper PP with respect to the head unit 3.

Figure 2:
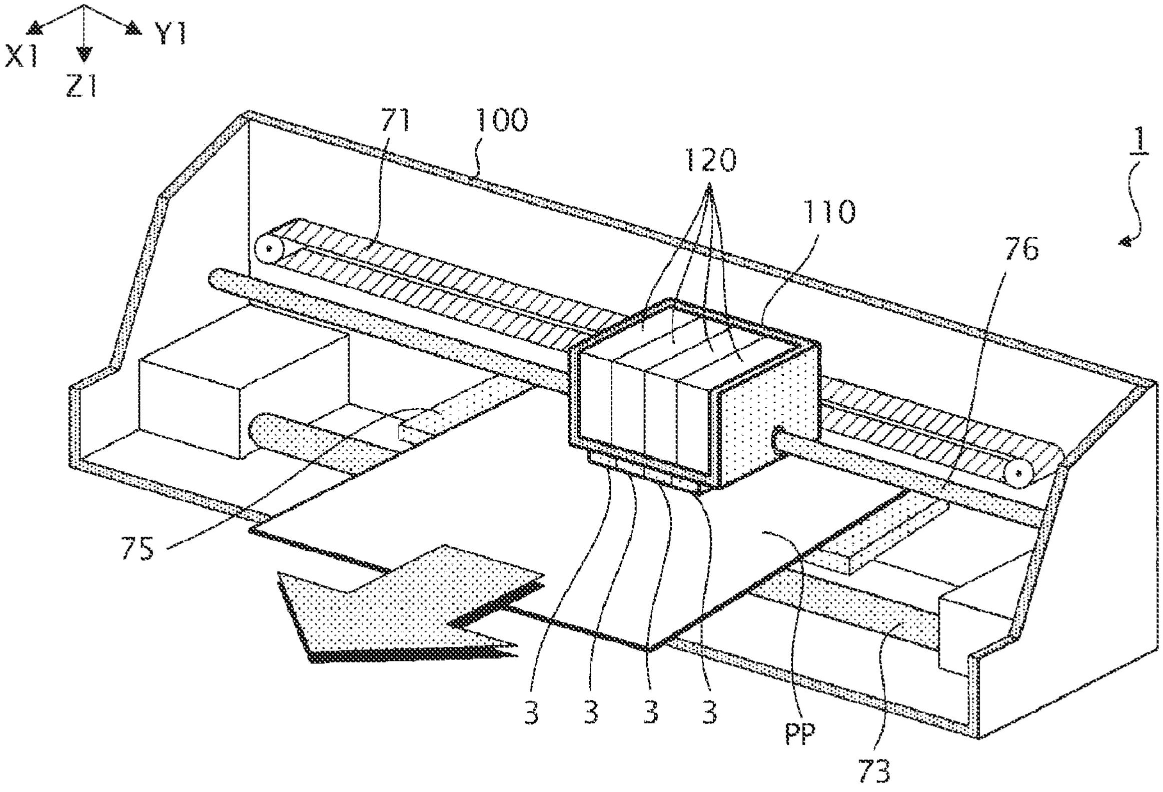
FIG. 2 is a perspective view illustrating an example of a schematic internal structure of the ink jet printer.

FIG. 2 is a perspective view illustrating an example of a schematic internal structure of the ink jet printer 1.

As illustrated in FIG. 2, in this embodiment, it is assumed that the ink jet printer 1 is a serial printer. Specifically, in executing print processing, while transporting the recording paper PP in an X1 direction, the ink jet printer 1 ejects ink from the ejection portion D[m] with the head units 3 reciprocated in a Y1 direction crossing the X1 direction and a Y2 direction that is an opposite direction of the Y1 direction, so that dots Dt corresponding to the print data Img are formed on the recording paper PP.

Hereinafter, the X1 direction and an X2 direction that is an opposite direction of the X1 direction will be collectively referred to as an “X-axis direction”, the Y1 direction crossing the X-axis direction and the Y2 direction that is the opposite direction of the Y1 direction will be collectively referred to as a “Y-axis direction”, and a Z1 direction crossing the X-axis direction and the Y-axis direction and a Z2 direction that is an opposite direction of the Z1 direction will be referred to as a “Z-axis direction”. In this embodiment, as an example, it is assumed that the X-axis direction, the Y-axis direction, and the Z-axis direction are orthogonal to each other. However, the present disclosure is not limited thereto. It is sufficient that the X-axis direction, the Y-axis direction, and the Z-axis direction cross each other. Note that, in this embodiment, the Z1 direction is a direction in which the ink is ejected from the ejection portion D[m].

As illustrated in FIG. 2, the ink jet printer 1 according to this embodiment includes a housing 100 and a carriage 110 that is configured to reciprocally move in the Y-axis direction in the housing 100 and on which the four head units 3 are mounted.

In this embodiment, as illustrated in FIG. 2, it is assumed that the carriage 110 stores four ink cartridges 120 corresponding to inks of four colors, that is, cyan, magenta, yellow, and black, on a one-to-one basis. In this embodiment, as described above, it is assumed that the ink jet printer 1 includes the four head units 3 corresponding to the four ink cartridges 120 on a one-to-one basis. Each ejection portion D[m] receives supply of the ink from one of the ink cartridges 120 corresponding to the head unit 3 in which the ejection portion D[m] is provided. Thus, inside of each ejection portion D[m] is filled with the supplied ink and the ejection portion D[m] can eject the filling ink from a nozzle N. Note that the ink cartridges 120 may be provided outside the carriage 110.

As described above, the ink jet printer 1 according to this embodiment includes the transport unit 7. As illustrated in FIG. 2, the transport unit 7 includes a carriage transport mechanism 71 that reciprocally moves the carriage 110 in the Y-axis direction, a carriage guide shaft 76 that supports the carriage 110 reciprocablly in the Y-axis direction, a medium transport mechanism 73 that transports the recording paper PP, and a platen 75 provided in the Z1 direction of the carriage 110. Therefore, when print processing is executed, the transport unit 7 changes a relative position of the recording paper PP with respect to the head units 3 to allow the ink to land on entire recording paper PP by reciprocating the head units 3 with the carriage 110 in the Y-axis direction along the carriage guide shaft 76 by the carriage transport mechanism 71 and transporting the recording paper PP on the platen 75 in the X1 direction by the medium transport mechanism 73.

Figure 3:
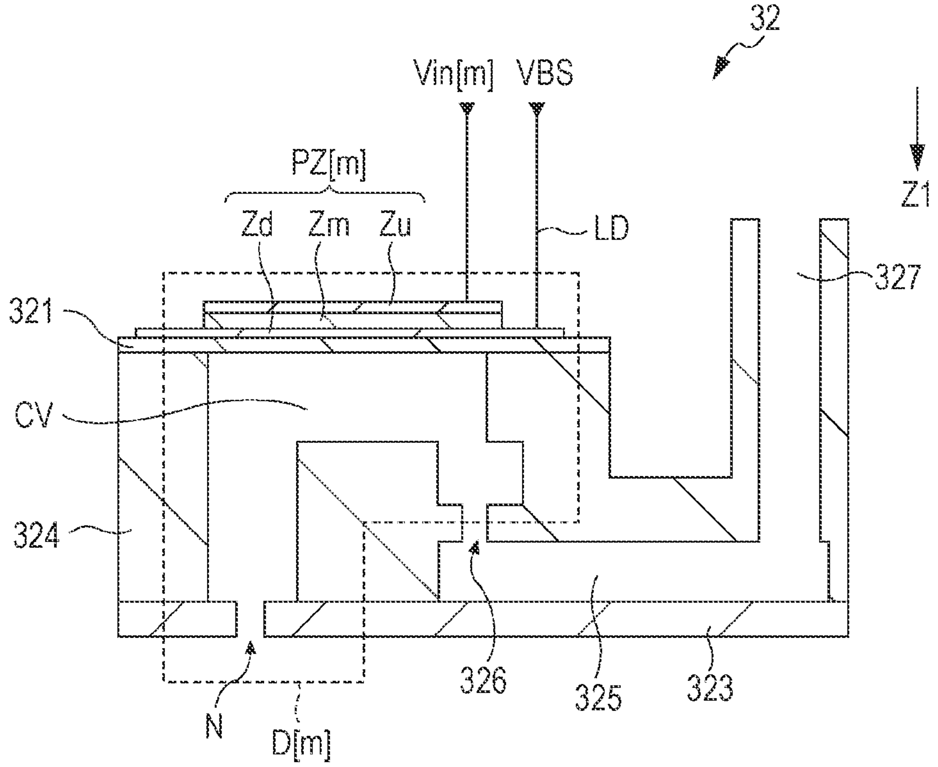
FIG. 3 is a sectional view illustrating an example of a structure of an ejection portion.

FIG. 3 is a schematic partial sectional view of the recording head 32 obtained by cutting the recording head 32 such that a cross section includes the ejection portion D[m].

As illustrated in FIG. 3, the ejection portion D[m] includes a piezoelectric element PZ[m], a cavity CV inside of which is filled with an ink, a nozzle N that communicates with the cavity CV, and a vibration plate 321. The ejection portion D[m] ejects the ink in the cavity CV from the nozzle N by driving the piezoelectric element PZ[m] with the supply driving signal Vin[m]. The cavity CV is a space defined by a cavity plate 324, a nozzle plate 323 in which the nozzle N is formed, and the vibration plate 321. The cavity CV communicates with a reservoir 325 via an ink supply port 326. The reservoir 325 communicates with the ink cartridge 120 corresponding to the ejection portion D[m] via an ink inlet port 327. The piezoelectric element PZ[m] includes an upper electrode Zu[m], a lower electrode Zd[m], a piezoelectric body Zm[m] provided between the upper electrode Zu[m] and the lower electrode Zd[m]. The lower electrode Zd[m] is electrically coupled to a feeder line LD set to a potential VBS. Then, when the supply driving signal Vin[m] is supplied to the upper electrode Zu[m] and thus a voltage is applied between the upper electrode Zu[m] and the lower electrode Zd[m], the piezoelectric element PZ[m] is displaced in the Z1 direction or the Z2 direction in accordance with the applied voltage, so that the piezoelectric element PZ[m] vibrates. The lower electrode Zd[m] is joined to the vibration plate 321. Therefore, when the piezoelectric element PZ[m] is driven by the supply driving signal Vin[m] to vibrate, the vibration plate 321 also vibrates. A volume of the cavity CV and a pressure in the cavity CV change due to vibration of the vibration plate 321 and thus the ink with which the cavity CV is filled is ejected from the nozzle N.

Note that a portion of the ink ejected from the nozzle N in the print processing becomes mist before hitting the recording paper PP and floats in the housing 100.

2. Outline of Head Unit

An outline of the head unit 3 will be described below with reference to FIG. 4 to FIG. 6.

Figure 4:
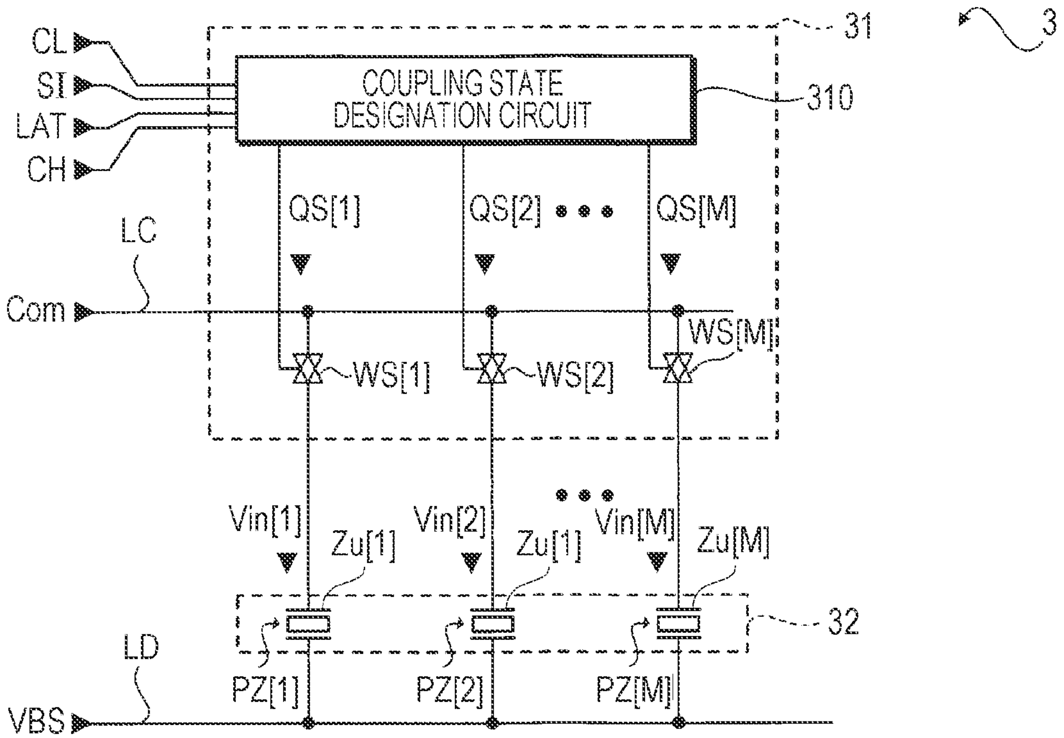
FIG. 4 is a block diagram illustrating an example of a configuration of a head unit.

FIG. 4 is a block diagram illustrating an example of a configuration of the head unit 3.

As illustrated in FIG. 4, the head unit 3 includes the supply circuit 31 and the recording head 32. The head unit 3 includes wiring LC through which the driving signal Com is supplied from the driving signal generation unit 4.

As illustrated in FIG. 4, the supply circuit 31 includes M switches WS[1] to WS[M] corresponding to the M ejection portions D[1] to D[M] on a one-to-one basis and a coupling state designation circuit 310 that designates a coupling state of each switch.

The coupling state designation circuit 310 generates a coupling state designation signal QS[m] that designates on and off of a switch WS[m], based on at least some of the print signal SI, a latch signal LAT, and a change signal CH supplied from the control unit 2.

The switch WS[m] switches, based on the coupling state designation signal QS[m], between conduction and non-conduction between the wiring LC and the upper electrode Zu[m] of the piezoelectric element PZ[m] provided in the ejection portion D[m]. In this embodiment, the switch WS[m] turns on when the coupling state designation signal QS[m] is at a high level and turns off when the coupling state designation signal QS[m] is at a low level. When the switch WS[m] turns on, the driving signal Com that is supplied to the wiring LC is supplied as the supply driving signal Vin[m] to the upper electrode Zu[m] of the ejection portion D[m].

In this embodiment, when the ink jet printer 1 executes print processing, one or more unit periods TP are set as an operation period of the ink jet printer 1. The ink jet printer 1 according to this embodiment can drive each ejection portion D[m] for the print processing in each unit period TP.

Figure 5:
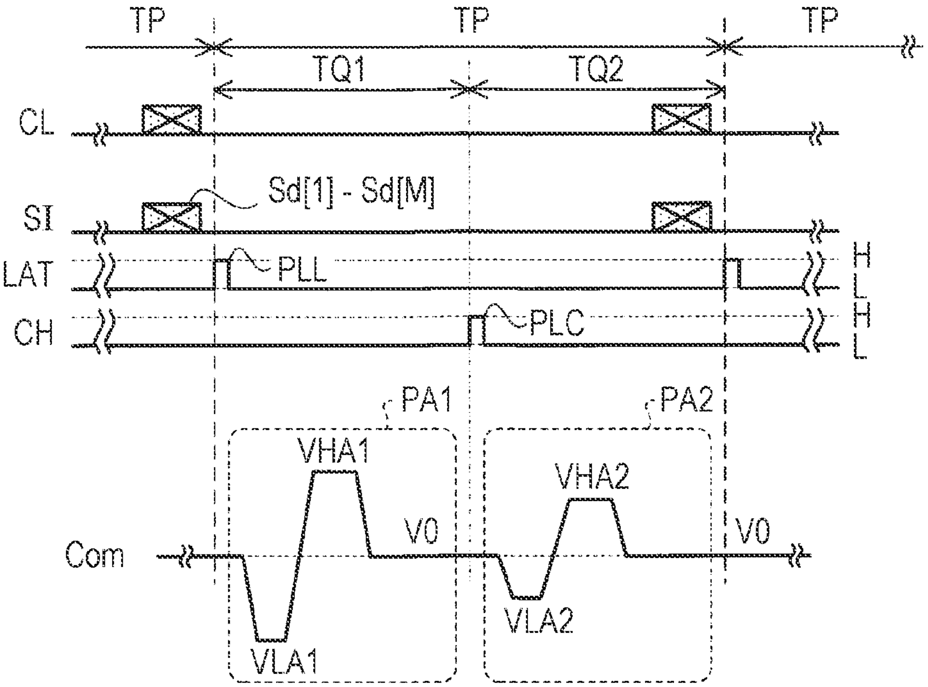
FIG. 5 is a timing chart illustrating an example of a signal supplied to the head unit.

FIG. 5 is a timing chart illustrating various signals, such as the driving signal Com or the like, supplied to the head unit 3 in the unit period TP.

As illustrated in FIG. 5, the control unit 2 outputs the latch signal LAT having a pulse PLL. Thus, the control unit 2 defines the unit period TP as a period from a rise of a pulse PLL to a rise of a next pulse PLL.

The control unit 2 also outputs the change signal CH having a pulse PLC in the unit period TP. Then, the control unit 2 divides the unit period TP into a driving period TQ1 from the rise of the pulse PLL to a rise of the pulse PLC and a driving period TQ2 from the rise of the pulse PLC to the rise of the next pulse PLL.

As illustrated in FIG. 5, the print signal SI includes M individual designation signals Sd[1] to Sd[M] corresponding to the M ejection portion D[1] to D[M] on a one-to-one basis. When the ink jet printer 1 executes print processing, an individual designation signal Sd[m] designates a mode of driving of the ejection portion D[m] in each unit period TP. Prior to each unit period TP, the control unit 2 supplies the print signal SI including the M individual designation signals Sd[1] to Sd[M] to the coupling state designation circuit 310 in synchronization with a clock signal CL. Then, the coupling state designation circuit 310 generates the coupling state designation signal QS[m], based on the individual designation signal Sd[m], in the unit period TP.

Note that, in this embodiment, it is assumed that, in the unit period TP in which print processing is executed, the ejection portion D[m] is configured to form the dots Dt of any ones of large dots formed of ink of an ink amount $\xi 1$, medium dots formed of ink of an ink amount ξ2 that is smaller than the ink amount ξ1, and small dots formed of ink of an ink amount ξ3 that is smaller than the ink amount ξ2.

FIG. 6 is a table illustrating the individual designation signal Sd[m].

As illustrated in FIG. 6, in this embodiment, the individual designation signal Sd[m] can be any one of four values, that is, a value "1" that designates the ejection portion D[m] as a large dot forming ejection portion DP-1, a value "2" that designates the ejection portion D[m] as a medium dot forming ejection portion DP-2, a value "3" that designates the ejection portion D[m] as a small dot forming ejection portion DP-3, and a value "4" that designates the ejection portion D[m] as a non-dot-forming ejection portion DP-N in the unit period TP in which print processing is executed. Herein, the large dot forming ejection portion DP-1 is an ejection portion D that forms large dots in the unit period TP. The medium dot forming ejection portion DP-2 is an ejection portion D that forms medium dots in the unit period TP. The small dot forming ejection portion DP-3 is an ejection portion D that forms small dots in the unit period TP. The non-dot-forming ejection portion DP-N is an ejection portion D that does not form dots in the unit period TP.

Return to description of FIG. 5. As illustrated in FIG. 5, in this embodiment, the driving signal Com has a waveform PA1 provided in a driving period TQ1 and a waveform PA2 provided in a driving period TQ2. Of the waveforms, the waveform PA1 is a waveform in which a potential changes from a reference potential V0 to a potential VLA1 that is lower than the reference potential V0 and a potential VHA1 that is higher than the reference potential V0, and then, returns to the reference potential V0. The waveform PA1 is determined such that, when the supply driving signal Vin[m] having the waveform PA1 is supplied to the ejection portion D[m], ink corresponding to an ink amount φ1 is ejected from the ejection portion D[m].

The waveform PA2 is a waveform in which a potential changes from the reference potential V0 to a potential VLA2 that is lower than the reference potential V0 and a potential VHA2 that is higher than the reference potential V0, and then, returns to the reference potential V0. The waveform PA2 is determined such that, when the supply driving signal Vin[m] having the waveform PA2 is supplied to the ejection portion D[m], ink corresponding to an ink amount φ2 is ejected from the ejection portion D[m].

Note that, in this embodiment, it is assumed that the ink amount ξ1 corresponds to a sum of the ink amount φ1 and the ink amount φ2, the ink amount ξ2 corresponds to the ink amount φ1, and the ink amount ξ3 corresponds to the ink amount φ2.

In this embodiment, as an example, it is assumed that, when a potential of the supply driving signal Vin[m] supplied to the ejection portion D[m] is high, the volume of the cavity CV of the ejection portion D[m] is smaller than that when the potential is low. Therefore, when the ejection portion D[m] is driven by the supply driving signal Vin[m] having the waveform PA1 or the like, the potential of the supply driving signal Vin[m] changes from a low potential to a high potential, so that the ink in the ejection portion D[m] is ejected from the nozzle N.

As illustrated in FIG. 6, when the individual designation signal Sd[m] represents the value "1" that designates the ejection portion D[m] as the large dot forming ejection portion DP-1 in the unit period TP, the coupling state designation circuit 310 sets the coupling state designation signal QS[m] to a high level in the driving period TQ1 and the driving period TQ2. In this case, the switch WS[m] turns on in the driving period TQ1 and the driving period TQ2. Therefore, the ejection portion D[m] is driven by the supply driving signal Vin[m] having the waveform PA1 and the waveform PA2 to eject ink of the ink amount ξ1 corresponding to large dots in the unit period TP.

When the individual designation signal Sd[m] represents the value "2" that designates the ejection portion D[m] as the medium dot forming ejection portion DP-2 in the unit period TP, the coupling state designation circuit 310 sets the coupling state designation signal QS[m] to a high level in the driving period TQ1, and in this case, the switch WS[m] turns on in the driving period TQ1. Therefore, the ejection portion D[m] is driven by the supply driving signal Vin[m] having the waveform PA1 to eject ink of the ink amount ξ2 corresponding to medium dots in the unit period TP.

When the individual designation signal Sd[m] represents the value "3" that designates the ejection portion D[m] as the small dot forming ejection portion DP-3 in the unit period TP, the coupling state designation circuit 310 sets the coupling state designation signal QS[m] to a high level in the driving period TQ2. In this case, the switch WS[m] turns on in the driving period TQ2. Therefore, the ejection portion D[m] is driven by the supply driving signal Vin[m] having the waveform PA2 to eject ink of the ink amount ξ3 corresponding to small dots in the unit period TP.

When the individual designation signal Sd[m] represents the value "4" that designates the ejection portion D[m] as the non-dot-forming ejection portion DP-N in the unit period TP, the coupling state designation circuit 310 sets the coupling state designation signal QS[m] to a low level throughout the unit period TP. In this case, the switch WS[m] is off throughout the unit period TP. Therefore, the ejection portion D[m] is not driven by the supply driving signal Vin[m] in the unit period TP, so that the ejection portion D[m] does not eject ink.

3. Driving Signal Generation Unit

An outline of the driving signal generation unit 4 will be described below with reference to FIG. 7.

Figure 7:
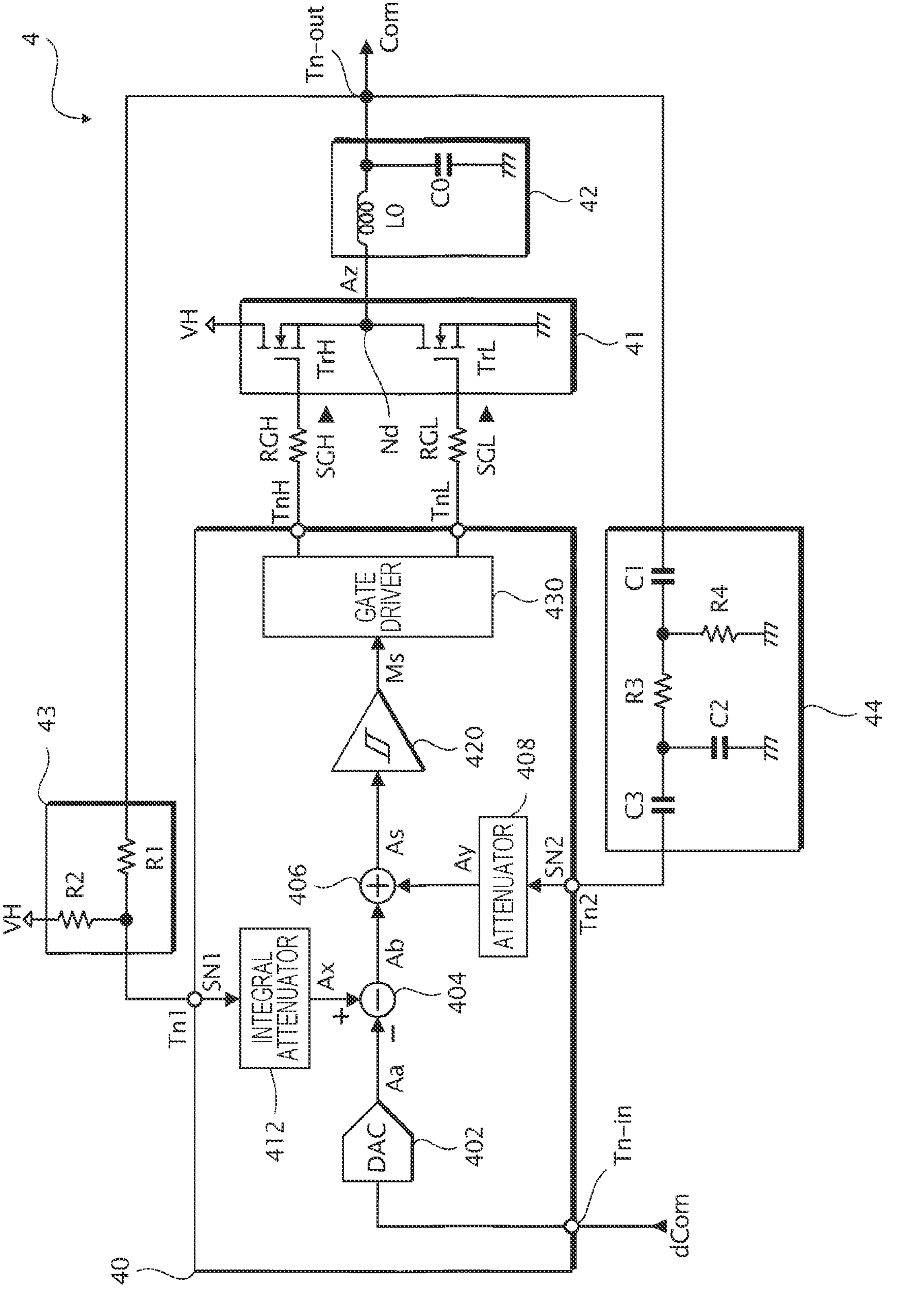
FIG. 7 is a block diagram illustrating an example of a configuration of a driving signal generation unit.

FIG. 7 is a block diagram illustrating an example of a circuit configuration of the driving signal generation unit 4.

As illustrated in FIG. 7, the driving signal generation unit 4 includes an integrated circuit 40, an amplifier circuit 41, a smoothing circuit 42, a pull-up circuit 43, and a filter circuit 44 and generates the driving signal Com, based on the waveform designation signal dCom.

The integrated circuit 40 is, for example, an LSI, that is, a large scale integration, and generates a gate signal SGH and a gate signal SGL, based on the waveform designation signal dCom. The integrated circuit 40 includes an analog conversion circuit 402, a subtractor 404, an adder 406, an attenuator 408, an integral attenuator 412, a comparator 420, and a gate driver 430.

The analog conversion circuit 402 is a DAC, that is, a digital-to-analog converter, and converts the digital waveform designation signal dCom to an analog signal Aa. Note that a voltage amplitude of the signal Aa is, for example, about 0 to 2 volts, and a signal obtained by amplifying the voltage about 20 times is the driving signal Com. That is, the signal Aa is a signal before amplification into the driving signal Com.

The integral attenuator 412 attenuates a signal SN1 that is input to a terminal Tn1 that will be described later and then outputs an integrated signal Ax.

The subtractor 404 outputs a signal Ab representing a potential obtained by subtracting a potential of the signal Aa from a potential of the signal Ax.

The attenuator 408 outputs a signal Ay obtained by attenuating a high frequency component of a signal SN2 that is input to a terminal Tn2 that will be described later.

The adder 406 outputs a signal As representing a potential obtained by adding a potential of the signal Ab to a potential of the signal Ay.

The comparator 420 outputs a modulation signal Ms obtained by pulse-modulating the signal As. Specifically, the comparator 420 outputs the modulation signal Ms that goes to a high level when a voltage of the signal As is a threshold voltage Vth1 or more during increase of the voltage of the signal As and goes to a low level when the voltage is lower than a threshold voltage Vth2 during dropping of the voltage of the signal As. Note that the threshold voltage Vth1 and the threshold voltage Vth2 are set to be in a relationship "Vth1>Vth2".

Note that a power supply voltage of a circuit from the analog conversion circuit 402 to the comparator 420 is a low voltage, that is, for example, about 3.3 volts. In contrast, the driving signal Com has a large amplitude, and a voltage of the driving signal Com exceeds, for example, 40 volts in some cases. Therefore, in the integral attenuator 412, the signal SN1 having an amplitude corresponding to the driving signal Com is attenuated to match an amplitude range of the signal Ax to an amplitude range of a signal in the circuit from the analog conversion circuit 402 to the comparator 420.

In this embodiment, as the waveform designation signal dCom, a digital signal is used as an example. However, it is sufficient that the waveform designation signal dCom is a signal that defines a target value in generating the driving signal Com and, for example, the analog signal Aa may be used as the waveform designation signal dCom. When the signal Aa is the waveform designation signal dCom, the integrated circuit 40 may be configured without the analog conversion circuit 402.

The gate driver 430 outputs, to a terminal TnH, the gate signal SGH obtained by converting the modulation signal Ms into a specific amplitude. The gate driver 430 also outputs, to a terminal TnL, the gate signal SGL obtained by converting a signal obtained by inverting a logic level of the modulation signal Ms to a signal with a specific amplitude.

The amplifier circuit 41 includes, for example, a transistor TrH and a transistor TrL and generates an amplification signal Az that is a signal obtained by amplifying the modulation signal Ms, based on the gate signal SGH and the gate signal SGL output from the integrated circuit 40. Note that, in this embodiment, as an example, it is assumed that the transistor TrH and the transistor TrL are N-channel field effect transistors, that is, N-channel FETs.

The gate signal SGH output from the gate driver 430 is input to a gate electrode of the transistor TrH via the terminal TnH and a resistor RGH.

The gate signal SGL output from the gate driver 430 is input to a gate electrode of the transistor TrL via the terminal TnL and a resistor RGL. Respective logic levels of the gate signal SGH and the gate signal SGL are in a mutually exclusive relationship.

As used herein, the term "mutually exclusive relationship" refers to a relationship in which a signal level of the gate signal SGH supplied to the gate electrode of the transistor TrH and a signal level of the gate signal SGL supplied to the gate electrode of the transistor TrL do not go to a high level at the same time, that is, the transistor TrH and the transistor TrL do not turn on at the same time. Note that the transistor TrH turns on when the gate electrode of the transistor TrH is at a high level and turns off when the gate electrode of the transistor TrH is at a low level. The transistor TrL turns on when the gate electrode of the transistor TrL is at a high level and turns off when the gate electrode of the transistor TrL is at a low level.

A drain electrode of the transistor TrH is electrically coupled to a feeder line set to a power supply potential VH on a high potential side and a source electrode thereof is electrically coupled to a node Nd.

A source electrode of the transistor TrL is grounded and a drain electrode thereof is electrically coupled to the node Nd. Note that the source electrode of the transistor TrL may be electrically coupled to the feeder line LD set to the potential VBS that is a power supply potential on a low potential side.

As described above, the transistor TrH turns on when the gate signal SGH supplied to the gate electrode thereof is at a high level and turns off when the gate signal SGH is at a low level. The transistor TrL turns on when the gate signal SGL supplied to the gate electrode thereof is at a high level and turns off when the gate signal SGL is at a low level. Therefore, the amplification signal Az obtained by amplifying the modulation signal Ms is output to the node Nd that electrically couples the source electrode of the transistor TrH and the drain electrode of the transistor TrL together. Note that, in this embodiment, one of the transistor TrH and the transistor TrL is an example of a "signal generation transistor".

The smoothing circuit 42 is an LPF, that is, a low pass filter, and smooths the amplification signal Az to generate the driving signal Com. The smoothing circuit 42 includes an inductor L0 and a capacitor C0. The inductor L0 is configured such that one end thereof is electrically coupled to the node Nd and the other end thereof is electrically coupled to an output terminal Tn-out. The capacitor C0 is configured such that one end thereof is electrically coupled to the output terminal Tn-out and the other end thereof is grounded. The driving signal Com obtained by smoothing the amplification signal Az is output from the output terminal Tn-out. Note that, in this embodiment, the amplification signal Az input to the inductor L0 is an example of an "input signal" and the inductor L0 is an example of a "signal generation coil".

The pull-up circuit 43 feeds back, to the terminal Tn1, the signal SN1 obtained by pulling up the driving signal Com output to the output terminal Tn-out. The pull-up circuit 43 includes a resistor R1 configured such that one end thereof is electrically coupled to the output terminal Tn-out and the other end thereof is electrically coupled to the terminal Tn1 and a resistor R2 configured such that one end thereof is electrically coupled to the terminal Tn1 and the other end thereof is electrically coupled to a feeder line set to the power supply potential VH.

The filter circuit 44 is a BPF, that is, a band pass filter, and feeds back, to the terminal Tn2, the signal SN2 obtained by cutting off a DC component of the driving signal Com from a frequency component in a specific band. The filter circuit 44 includes a resistor R3, a capacitor C1 configured such that one end thereof is electrically coupled to the output terminal Tn-out and the other end thereof is electrically coupled to one end of the resistor R3, a resistor R4 configured such that one end thereof is electrically coupled to the one end of the resistor R3 and the other end thereof is grounded, a capacitor C2 configured such that one end thereof is electrically coupled to the other end of the resistor R3 and the other end thereof is grounded, and a capacitor C3 configured such that one end thereof is electrically coupled to the other end of the resistor R3 and the other end thereof is electrically coupled to the terminal Tn2.

Among the above-described components of the filter circuit 44, the capacitor C1 and the resistor R4 function as HPFs, that is, high pass filters, that pass high frequency components of a cutoff frequency or higher in the driving signal Com. The resistor R3 and the capacitor C2 function as LPFs, that is, low pass filters, that pass low frequency components of a cutoff frequency or lower in the driving signal Com. In this embodiment, in the filter circuit 44, the cutoff frequency of the HPFs is set lower than the cutoff frequency of the LPFs. Therefore, the filter circuit 44 passes frequency components of the driving signal Com in a specific band that is equal to or higher than the cutoff frequency of the HPFs and equal to or lower than the cutoff frequency of the LPFs. The filter circuit 44 includes the capacitor C3, and therefore, feeds back, to the terminal Tn2, signals of the driving signal Com in which DC components are cut off from signals of frequency components in a specific band that have passed through the HPFs and the LPFs.

As described above, the driving signal generation unit 4 generates the driving signal Com by smoothing the amplification signal Az in the node Nd by the smoothing circuit 42. The driving signal Com is integrated and subtracted by the integral attenuator 412, and then, is fed back to the subtractor 404. Therefore, the driving signal generation unit 4 performs self-oscillation at a frequency determined by a delay in the smoothing circuit 42, a delay in the integral attenuator 412, and a transfer function of feedback. However, since a delay amount of a feedback path via the terminal Tn1 is large, the frequency of self-oscillation cannot be made high enough to sufficiently ensure accuracy of a waveform of the driving signal Com only by feedback via the terminal Tn1. In contrast, in this embodiment, a path on which the high frequency components of the driving signal Com are fed back via the terminal Tn2 is provided separately from a path on which the high frequency components of the driving signal Com are fed back via the terminal Tn1, and therefore, a delay of feedback in the entire driving signal generation unit 4 can be made small. That is, in this embodiment, a frequency of the signal As obtained by adding the signal Ay that is a high frequency component of the driving signal Com to the signal Ab can be made high, as compared to when there is no feedback path via the terminal Tn2, so that the accuracy of the driving signal Com can be sufficiently ensured.

4. Driving Signal Generation Unit and Storage Unit

The driving signal generation unit 4 and a storage unit 600 that stores the driving signal generation unit 4 will be described below with reference to FIG. 8 and FIG. 9.

Figure 8:
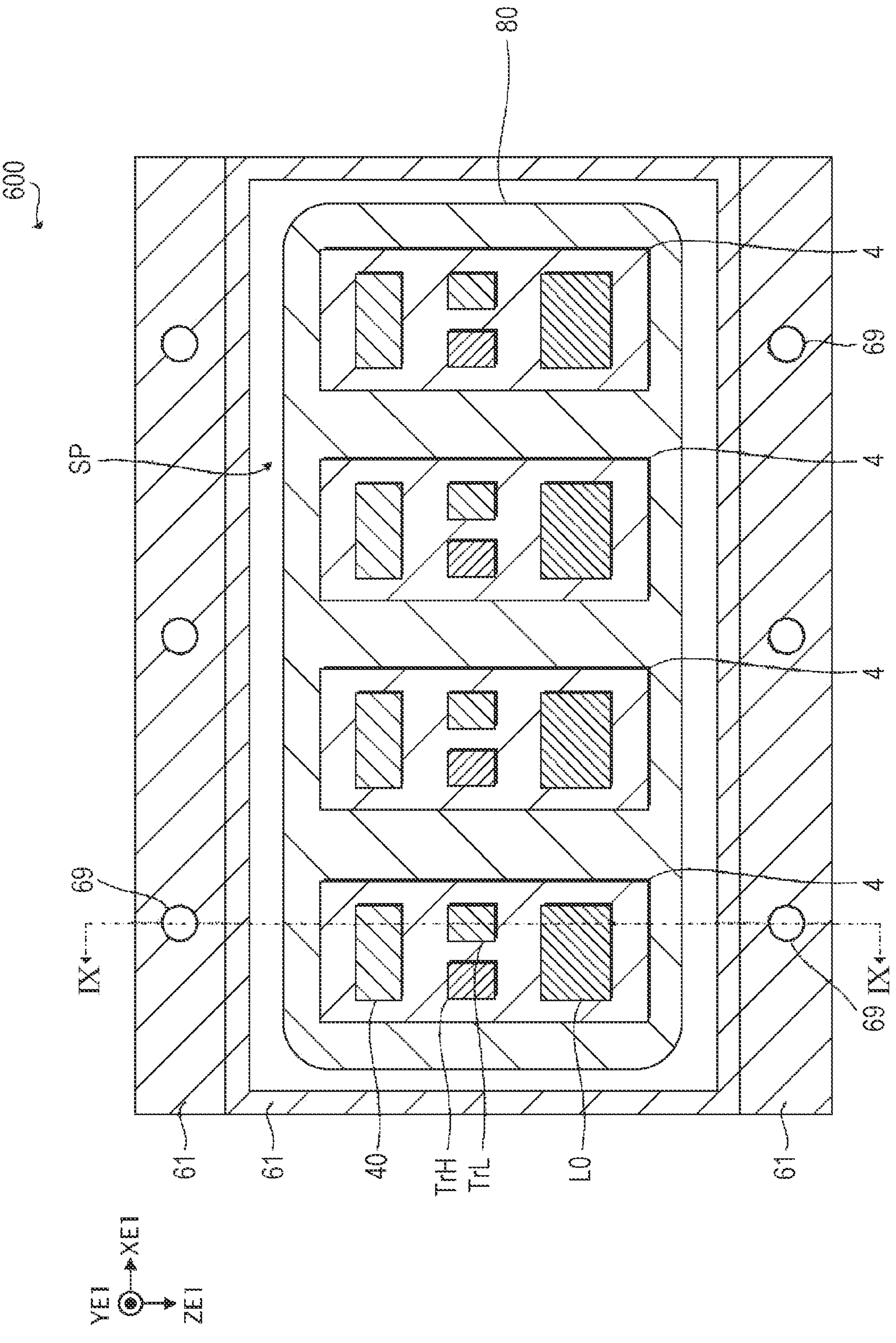
FIG. 8 is a plan view illustrating an example of a structure of a storage unit and a heat conduction member.

FIG. 8 is a plan view illustrating the driving signal generation unit 4 and the storage unit 600 as viewed in plan view from a YE1 direction toward a YE2 direction opposite to the YE1 direction. FIG. 9 is a sectional view illustrating the driving signal generation unit 4 and the storage unit 600 taken along a line IX-IX in FIG. 8.

Note that, hereinafter, the YE1 direction and the YE2 direction that is an opposite direction of the YE1 direction will be collectively referred to as a "YE axis direction", an XE1 direction crossing the YE axis direction and an XE2 direction that is an opposite direction of the XE1 direction will be collectively referred to as an "XE axis direction", and a ZE1 direction crossing the XE axis direction and the YE axis direction and a ZE2 direction that is an opposite direction of the ZE1 direction will be collectively referred to as a "ZE axis direction". In this embodiment, as an example, it is assumed that the XE axis direction, the YE axis direction, and the ZE axis direction are orthogonal to each other. However, the present disclosure is not limited thereto. It is sufficient that the XE axis direction, the YE axis direction, and the ZE axis direction cross each other. In this embodiment, the ZE1 direction is a direction approximately in parallel to a gravitational acceleration direction. Moreover, the ZE1 direction may be a direction approximately in parallel to the Z1 direction. As used herein, the term "approximately in parallel" refers a concept including a case where the mentioned directions can be regarded as being in parallel in consideration of an error, in addition to a case where the mentioned directions are completely in parallel. In this embodiment, the term "approximately in parallel" refers to a concept including a case where the mentioned directions can be regarded as being in parallel in consideration of an error of about plus or minus 10%.

Figure 9:
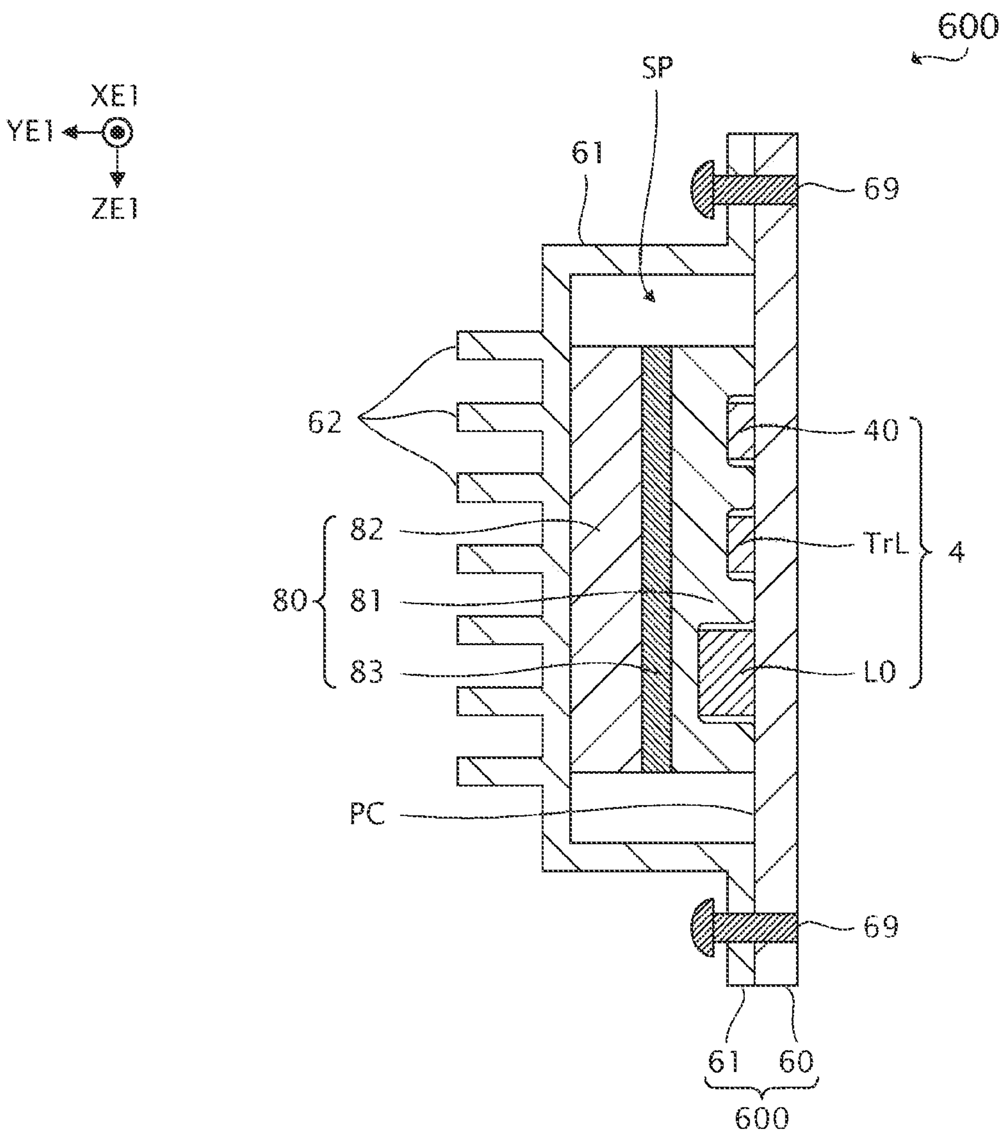
FIG. 9 is a sectional view illustrating an example of a structure of the storage unit and the heat conduction member.

As illustrated in FIG. 8 and FIG. 9, the storage unit 600 includes a circuit board 60 and a cover 61.

The driving signal generation unit 4 is provided on a circuit forming surface PC of the circuit board 60. Herein, the circuit forming surface PC is one surface of two surfaces of the circuit board 60 to which the YE axis direction is normal, the one surface facing in the YE1 direction.

The cover 61 is, for example, formed of metal. The cover 61 preferably has a thermal conductivity of 10 [W/m·K] or more and more preferably has a thermal conductivity of 50 [W/m·K] or more. As the cover 61, for example, iron, copper, or the like can be employed.

The cover 61 is fixed to the circuit board 60 by a screw 69 so as to be in contact with the circuit forming surface PC of the circuit board 60. Note that the cover 61 has a shape with a portion around a center thereof in the ZE axis direction protruding in the YE1 direction. Therefore, a space SP is formed between the circuit forming surface PC of the circuit board 60 and the cover 61 by fixing the cover 61 to the circuit forming surface PC of the circuit board 60. The portion of the cover 61 protruding in the YE1 direction will be hereinafter referred to as a "protruding portion of the cover 61" sometimes.

Note that, in this embodiment, it is assumed that the space SP is a sealed space enclosed by the circuit board 60 and the cover 61, but the present disclosure is not limited thereto. For example, the space SP may be an open space that communicates with a space outside the storage unit 600 via a gap existing between the circuit board 60 and the cover 61.

A heat sink 62 is provided to the cover 61. Specifically, the heat sink 62 is provided at a portion of the cover 61 located in the YE1 direction as viewed from the space SP. That is, the heat sink 62 is provided at the protruding portion of the cover 61. However, the present disclosure is not limited thereto. For example, the heat sink 62 may be provided at a portion of the cover 61 located in the ZE2 direction as viewed from the space SP.

A heat conduction member 80 that conducts heat generated in the driving signal generation unit 4 to the heat sink 62 is provided in the space SP. In this embodiment, the heat conduction member 80 includes a heat conductive material 81 provided so as to be in contact with the driving signal generation unit 4, a heat conductive material 82 provided so as to be in contact with a surface of the protruding portion of the cover 61 in the YE2 direction, and a reinforcing member 83 that supports the heat conductive material 81 and the heat conductive material 82.

The heat conductive material 81 is a flame-retardant material having thermal conductivity, heat resistance, and insulating property.

More specifically, the heat conductive material 81 has a thermal conductivity that is at least higher than that of air, is required, for example, to have a thermal conductivity of 0.1 [W/m·K] or more, preferably has a thermal conductivity of 0.2 [W/m·K] or more, and more preferably has a thermal conductivity of 0.8 [W/m·K] or more.

The heat conductive material 81 is a flexible material that follows an uneven surface of the driving signal generation unit 4 in the YE1 direction. For example, the heat conductive material 81 is an elastic material, such as rubber, a jelly-like (gelled) material, such as gel, or a semi-solid or paste-like material, such as grease.

The heat conductive material 81 is chemically stable, is excellent in chemical resistance, and does not react with a reactive ink.

In this embodiment, as the heat conductive material 81, silicone is employed. Specifically, in this embodiment, as the heat conductive material 81, rubber type silicone is employed. However, as the heat conductive material 81, grease type or gel type silicone may be employed. Note that, as the heat conductive material 81, in addition to silicone, some other polymer gel excellent in thermal conductivity, heat resistance, insulating property, and chemical resistance may be employed.

The heat conductive material 82 may be a similar material to the heat conductive material 81. In this embodiment, as the heat conductive material 82, silicone is employed. Specifically, in this embodiment, as the heat conductive material 82, rubber type silicone is employed. However, unlike the heat conductive material 81, the heat conductive material 82 is not required to have a following property to follow an uneven shape, and therefore, a material less flexible than the heat conductive material 81 may be employed.

The reinforcing member 83 supports the heat conductive material 81 and the heat conductive material 82 to suppress change in positions of the heat conductive material 81 and the heat conductive material 82 in the ZE axis direction. Specifically, the reinforcing member 83 is a flame-retardant material having an insulating property. The reinforcing member 83 is excellent in chemical resistance and does not react with a reactive ink.

In this embodiment, as the reinforcing member 83, glass fiber made of glass in fibrous form is employed.

Note that, in this embodiment, the reinforcing member 83 does not completely separate the heat conductive material 81 and the heat conductive material 82 from each other and may have a gap through which a portion of the heat conductive material 81 and a portion of the heat conductive material 82 can contact each other.

As illustrated in FIG. 8, in this embodiment, when the storage unit 600 is viewed in plan view with respect to the YE2 direction, the heat conduction member 80 is provided such that the entire driving signal generation unit 4 is covered with the heat conductive material 81 provided in the heat conduction member 80. Moreover, as illustrated in FIG. 9, in this embodiment, the heat conduction member 80 is provided such that the driving signal generation unit 4 is sealed between the circuit forming surface PC of the circuit board 60 and the heat conductive material 81.

However, the present disclosure is not limited thereto and, for example, when the storage unit 600 is viewed in plan view with respect to the YE2 direction, the heat conduction member 80 may be provided such that only a portion of the driving signal generation unit 4 is covered with the heat conductive material 81.

In this embodiment, the heat conduction member 80 is provided such that the heat conductive material 81 is in contact with the integrated circuit 40, the transistor TrH, the transistor TrL, and the inductor L0.

However, the present disclosure is not limited thereto and the heat conduction member 80 may be provided such that the heat conductive material 81 is in contact with at least some of the transistor TrH, the transistor TrL, and the inductor L0. For example, the heat conduction member 80 may be provided such that the heat conductive material 81 is in contact with the transistor TrH and the transistor TrL, or the heat conduction member 80 may be provided such that the heat conductive material 81 is in contact with the inductor L0.

The driving signal generation unit 4 generates heat when generating the driving signal Com. Specifically, in the transistor TrH, the transistor TrL, and the inductor L0 of the driving signal generation unit 4, a large amount of heat is generated when the driving signal generation unit 4 generates the driving signal Com.

In contrast, in this embodiment, the heat conductive material 81 is in contact with the transistor TrH, the transistor TrL, and the inductor L0 of the driving signal generation unit 4. The heat conductive material 81 conducts heat generated in the transistor TrH, the transistor TrL, and the inductor L0 to the heat sink 62 via the heat conductive material 82. That is, in this embodiment, the heat generated in the transistor TrH, the transistor TrL, and the inductor L0 is dissipated to outside of the storage unit 600 via the heat conduction member 80 and the heat sink 62. Thus, according to this embodiment, as compared to a mode where the heat conduction member 80 is not provided, a probability that a failure occurs in the driving signal generation unit 4 due to the heat generated in the driving signal generation unit 4 can be reduced.

According to this embodiment, the driving signal generation unit 4 is stored in the storage unit 600, and furthermore, in the space SP in the storage unit 600, the heat conduction member 80 is provided so as to cover the driving signal generation unit 4. Therefore, according to this embodiment, as compared to a mode in which the heat conduction member 80 is not provided, a probability of dust and dirt adhering to the driving signal generation unit 4 can be reduced, and also, a probability that mist of reactive ink generated due to ejection of the reactive ink from the ejection portions D attaches to the driving signal generation unit 4 can be reduced. Therefore, according to this embodiment, as compared to a mode where the heat conduction member 80 is not provided, a probability that a failure, such as short circuit, an electric leakage, or the like, occurs in the driving signal generation unit 4 due to adherence of mist of the reactive ink to the driving signal generation unit 4 can be reduced.

According to this embodiment, the heat conduction member 80 is formed of a material that does not react with the reactive ink. Therefore, according to this embodiment, as compared to a mode where the heat conduction member 80 is formed of a material that has a low chemical resistance and reacts with the reactive ink, reduction over time in a "protective function against mist" of the heat conduction member 80 to protect the driving signal generation unit 4 from mist of the reactive ink and a "heat dissipating function" of the heat conduction member 80 to dissipate the heat generated in the driving signal generation unit 4 can be suppressed.

In this embodiment, the heat conduction member 80 includes the reinforcing member 83 that supports the heat conductive material 81 and the heat conductive material 82. Therefore, according to this embodiment, as compared to a mode where the heat conduction member 80 does not include the reinforcing member 83, a state where the heat conductive material 81 and the heat conductive material 82 are disposed at positions that allow the "protective function against mist" and the "heat dissipating function" of the heat conduction member 80 to be properly performed can be maintained. That is, according to this embodiment, as compared to a mode where the heat conduction member 80 does not include the reinforcing member 83, reduction over time in the "protective function against mist" to protect the driving signal generation unit 4 from mist of the reactive ink and the "heat dissipating function" to dissipate the heat generated in the driving signal generation unit 4 can be suppressed.

5. Conclusion of Embodiment

As described above, the ink jet printer 1 according to this embodiment includes the ejection portion D that ejects the reactive ink, the driving signal generation unit 4 that generates the driving signal Com to drive the ejection portion D, the heat sink 62 that dissipates the heat generated in the driving signal generation unit 4 due to generation of the driving signal Com, and the heat conduction member 80 that conducts the heat generated in the driving signal generation unit 4 to the heat sink 62, and the heat conduction member 80 includes the heat conductive material 81 with an insulating property whose state is not changed by a chemical reaction with the reactive ink and the reinforcing member 83 with an insulating property whose state is not changed by a chemical reaction with the reactive ink.

Therefore, according to this embodiment, as compared to a mode where the heat conduction member 80 is not provided, a probability that a failure occurs in the driving signal generation unit 4 due to the heat generated in the driving signal generation unit 4 can be reduced. According to this embodiment, as compared to a mode where the heat conduction member 80 is not provided, a probability that a failure, such as a short circuit, an electric leakage, or the like, occurs in the driving signal generation unit 4 due to adherence of mist of the reactive ink to the driving signal generation unit 4 can be reduced. According to this embodiment, as compared to a mode where the heat conduction member 80 is formed of a material that chemically reacts with the reactive ink, a state where the heat conduction member 80 protects the driving signal generation unit 4 from the reactive ink can be stably maintained.

According to this embodiment, the heat conductive material 81 may be silicone.

Therefore, according to this embodiment, the heat generated in the driving signal generation unit 4 can be dissipated and adherence of mist to the driving signal generation unit 4 can be suppressed.

According to this embodiment, the heat conductive material 81 may be a flame-retardant gel material.

Therefore, according to this embodiment, the heat generated in the driving signal generation unit 4 can be efficiently dissipated.

According to this embodiment, the reinforcing member 83 may be formed of glass fiber.

Therefore, according to this embodiment, a state where the heat conduction member 80 protects the driving signal generation unit 4 from the reactive ink can be stably maintained.

In this embodiment, the driving signal generation unit 4 may include the inductor L0 that smooths the amplification signal Az to generate the driving signal Com and include the transistor TrH that generates the amplification signal Az, and the heat conductive material 81 may be in contact with the inductor L0 and the transistor TrH. Moreover, in this embodiment, the driving signal generation unit 4 may include the inductor L0 that smooths the amplification signal Az to generate the driving signal Com and include the transistor TrL that generates the amplification signal Az, and the heat conductive material 81 may be in contact with the inductor L0 and the transistor TrL.

Therefore, according to this embodiment, as compared to a mode where the heat conductive material 81 is not in contact with the inductor L0 and the transistor TrH and a mode where the heat conductive material 81 is not in contact with the inductor L0 and the transistor TrL, the heat generated in the driving signal generation unit 4 can be efficiently dissipated.

In this embodiment, the heat conductive material 81 may be provided so as to entirely cover the inductor L0 and the transistor TrH on the circuit board 60 on which the driving signal generation unit 4 is disposed. Moreover, in this embodiment, the heat conductive material 81 may be provided so as to entirely cover the inductor L0 and the transistor TrL on the circuit board 60 on which the driving signal generation unit 4 is disposed.

Therefore, according to this embodiment, as compared to a mode where the heat conductive material 81 does not cover a portion of the inductor L0 and the transistor TrH, a probability that mist of the reactive ink adheres to the driving signal generation unit 4 can be reduced. According to this embodiment, as compared to a mode where the heat conductive material 81 does not cover a portion of the inductor L0 and the transistor TrL, a probability that mist of the reactive ink adheres to the driving signal generation unit 4 can be reduced.

In this embodiment, the heat conductive material 81 may be provided to entirely cover the driving signal generation unit 4 on the circuit board 60 on which the driving signal generation unit 4 is disposed.

Therefore, according to this embodiment, as compared to a mode where the heat conductive material 81 does not cover a portion of the driving signal generation unit 4, a probability that mist of the reactive ink adheres to the driving signal generation unit 4 can be reduced.

In this embodiment, the reactive ink may be any one of a solvent ink obtained by dispersing a coloring material in a solvent, a photoreactive ink whose property is changed through irradiation of light, a textile printing ink used for printing of a textile, or a pretreatment ink that is applied to a textile as pretreatment before printing.

Therefore, in this embodiment, even when the ink jet printer 1 is used for any of various applications, a state where the heat conduction member 80 protects the driving signal generation unit 4 from a reactive ink can be maintained.

B. MODIFIED EXAMPLES

Each embodiment described above may be variously modified. Specific modified examples will be described below. Two or more optionally selected examples from the modified examples described below can be combined as appropriate in a range in which they do not mutually contradict each other. Note that, in the modified examples described below, for elements having equivalent effects and functions to those of the embodiment, the reference sings that are referred to in the description given above are also used and the detailed description of each of the elements will be omitted, as appropriate.

First Modified Example

In the above-described embodiment, an example where the storage unit 600 includes the circuit board 60 has been described, but the present disclosure is not limited thereto. For example, the circuit board 60 may be provided separately from the storage unit 600 and be stored in the storage unit 600. In this case, the space SP may be a space in the storage unit 600 and be a space that stores the driving signal generation unit 4 and the circuit board 60.

Second Modified Example

In the above-described embodiment and the first modified example, an example where the control unit 2 is not stored in the storage unit 600 and is provided outside the storage unit 600 has been described, but the present disclosure is not limited thereto. For example, the control unit 2 may be stored in the storage unit 600.

Third Modified Example

In the above-described embodiment and the first and second modified examples, it is assumed that the ink jet printer 1 includes four head units 3, but the present disclosure is not limited thereto. The ink jet printer 1 may include one or more and three or less head units 3, or the ink jet printer 1 may include five or more head units 3.

Fourth Modified Example

In the above-described embodiment and the first to third modified examples, an example where the ink jet printer 1 is a serial printer has been described, but the present disclosure is not limited thereto. The ink jet printer 1 may be a so-called line printer in which, in the head unit 3, a plurality of nozzles N are provided so as to extend wider than the width of the recording paper PP.

What is claimed is:

1. A liquid ejecting apparatus comprising:
- an ejection portion that ejects a reactive ink;
- a driving circuit that generates a driving signal to drive the ejection portion;
- a heat sink that dissipates heat generated in the driving circuit due to generation of the driving signal; and
- a heat conduction member that conducts the heat generated in the driving circuit to the heat sink, wherein
- the heat conduction member includes
  - a heat conductive material with an insulating property whose state is not changed by a chemical reaction with the reactive ink, and
  - a reinforcing member with an insulating property whose state is not changed by a chemical reaction with the reactive ink.

2. The liquid ejecting apparatus according to claim 1, wherein
- the heat conductive material is silicone.

3. The liquid ejecting apparatus according to claim 1, wherein,
- the heat conductive material is a flame-retardant gel material.

4. The liquid ejecting apparatus according to claim 1, wherein
- the reinforcing member is glass fiber.

5. The liquid ejecting apparatus according to claim 1, wherein
- the driving circuit includes
  - a signal generation coil that smooths an input signal to generate the driving signal, and
  - a signal generation transistor that generates the input signal, and
- the heat conductive material is in contact with the signal generation coil and the signal generation transistor.

6. The liquid ejecting apparatus according to claim 5, wherein
- the heat conductive material is provided
  - on a circuit board on which the driving circuit is disposed
  - so as to entirely cover the signal generation coil and the signal generation transistor.

7. The liquid ejecting apparatus according to claim 1, wherein
- the heat conductive material is provided
  - on a circuit board on which the driving circuit is disposed
  - so as to entirely cover the driving circuit.

8. The liquid ejecting apparatus according to claim 1, wherein
- the reactive ink is any one of
  - a solvent ink obtained by dispersing a coloring material in a solvent,
  - a photoreactive ink whose property is changed through irradiation of light,
  - a textile printing ink used for printing of a textile, or
  - a pretreatment ink that is applied to a textile as pretreatment before printing.

* * * * *